(No Model.)

7 Sheets—Sheet 1.

J. H. SWIFT.
BOX NAILING MACHINE.

No. 302,054.

Patented July 15, 1884.

(No Model.)  J. H. SWIFT.  7 Sheets—Sheet 2.
BOX NAILING MACHINE.

No. 302,054. Patented July 15, 1884.

(No Model.) 7 Sheets—Sheet 3.

J. H. SWIFT.
BOX NAILING MACHINE.

No. 302,054. Patented July 15, 1884.

Witnesses:
Geo. W. Miatt
Wm. Gardner

Inventor:
Joseph H. Swift
by Paul H. Bate
Attorney (No Model.)

J. H. SWIFT.
BOX NAILING MACHINE.

No. 302,054. Patented July 15, 1884.

7 Sheets—Sheet 4.

Witnesses:
Geo. W. Miatt
Wm Gardner

Inventor:
Joseph H. Swift
by Paul H. Bate
Attorney (No Model.)  J. H. SWIFT.  7 Sheets—Sheet 5.

BOX NAILING MACHINE.

No. 302,054. Patented July 15, 1884.

(No Model.)
7 Sheets—Sheet 6.
J. H. SWIFT.
BOX NAILING MACHINE.
No. 302,054.
Patented July 15, 1884.
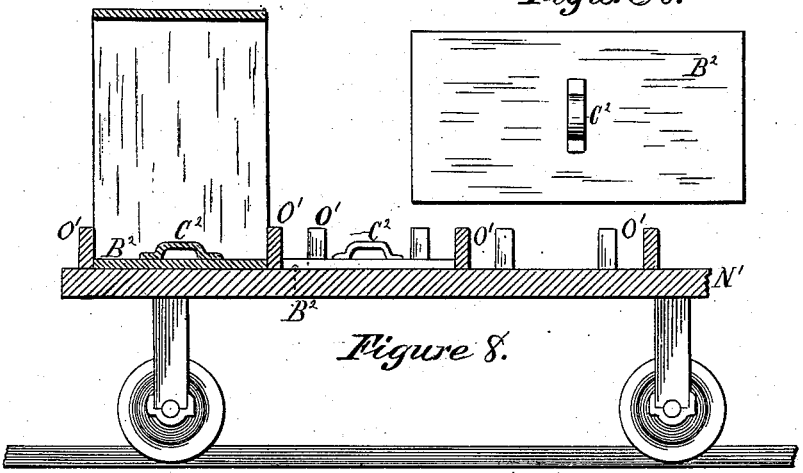
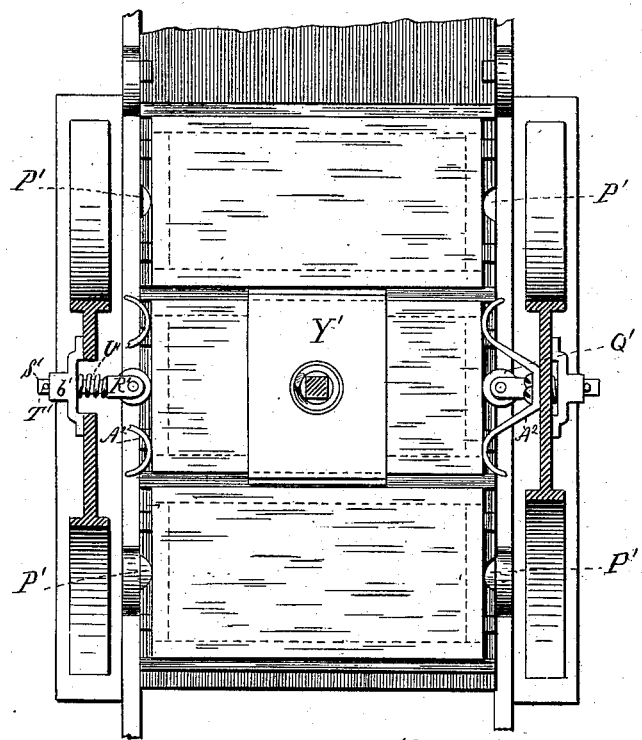
Witnesses:
Geo. W. Miatt
Wm. Gardner
Inventor:
Joseph H. Swift,
by Paul H. Bate,
Attorney.

(No Model.)
7 Sheets—Sheet 7.
J. H. SWIFT.
BOX NAILING MACHINE.
No. 302,054.　　　　　　　　　Patented July 15, 1884.
Figure 13.
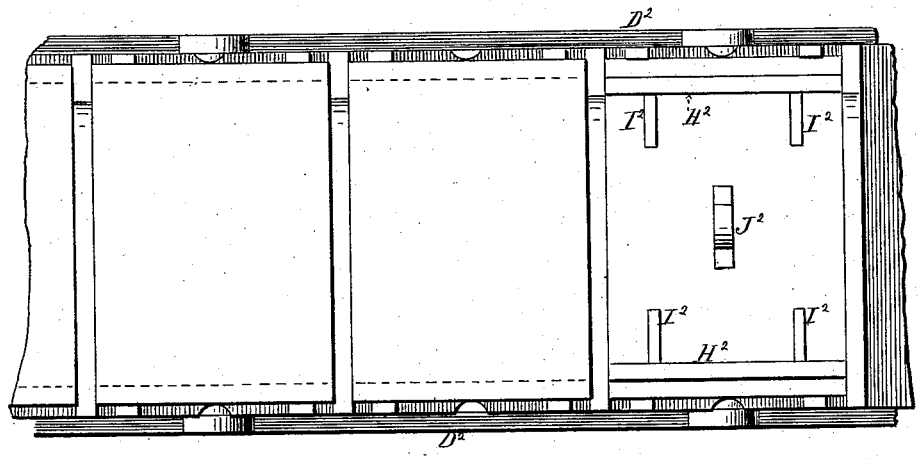
Figure 11.
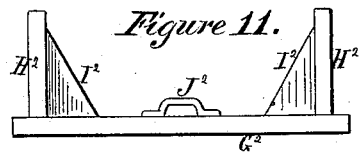
Figure 10.
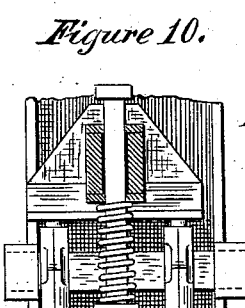
Figure 12.
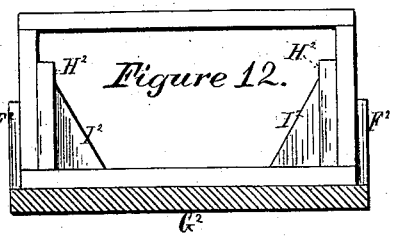
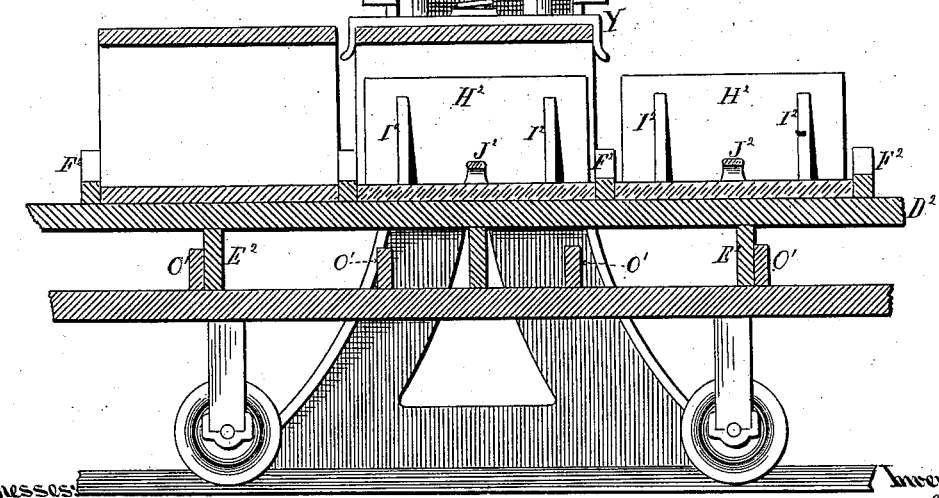
Witnesses:
Geo. W. Miatt
Wm Gardner
Inventor:
Joseph H. Swift
by Paul H. Bate
attorney

UNITED STATES PATENT OFFICE.

JOSEPH H. SWIFT, OF BROOKLYN, NEW YORK.

BOX-NAILING MACHINE.

SPECIFICATION forming part of Letters Patent No. 302,054, dated July 15, 1884.

Application filed March 14, 1884. (No model.)

*To all whom it may concern:*

Be it known that I, JOSEPH H. SWIFT, a citizen of the United States, residing in the city of Brooklyn, county of Kings, and State of New York, have invented certain new and useful Improvements in Box-Nailing Machines, of which the following is a specification, reference being had therein to the accompanying drawings.

The invention consists in providing means for nailing both ends of either the top, the bottom, or the side piece or pieces of the box to the box or box-frame, or to the end pieces thereof, at the same instant and by one operation; means for holding the box or box-frame, or the end pieces thereof, and either the top, the bottom, or the side piece or pieces of the box steady and in proper position during the operation of nailing; and, finally, means—such as a car and track, for instance—for supporting the box or box-frame, or the end pieces thereof, together with either the top, the bottom, or the side piece or pieces of the box, as the case may be, and for conveying the same to or holding the same in the proper position with reference to the nailing mechanism, in order that the operation of nailing on such piece or pieces may be carried out.

Figure 1:
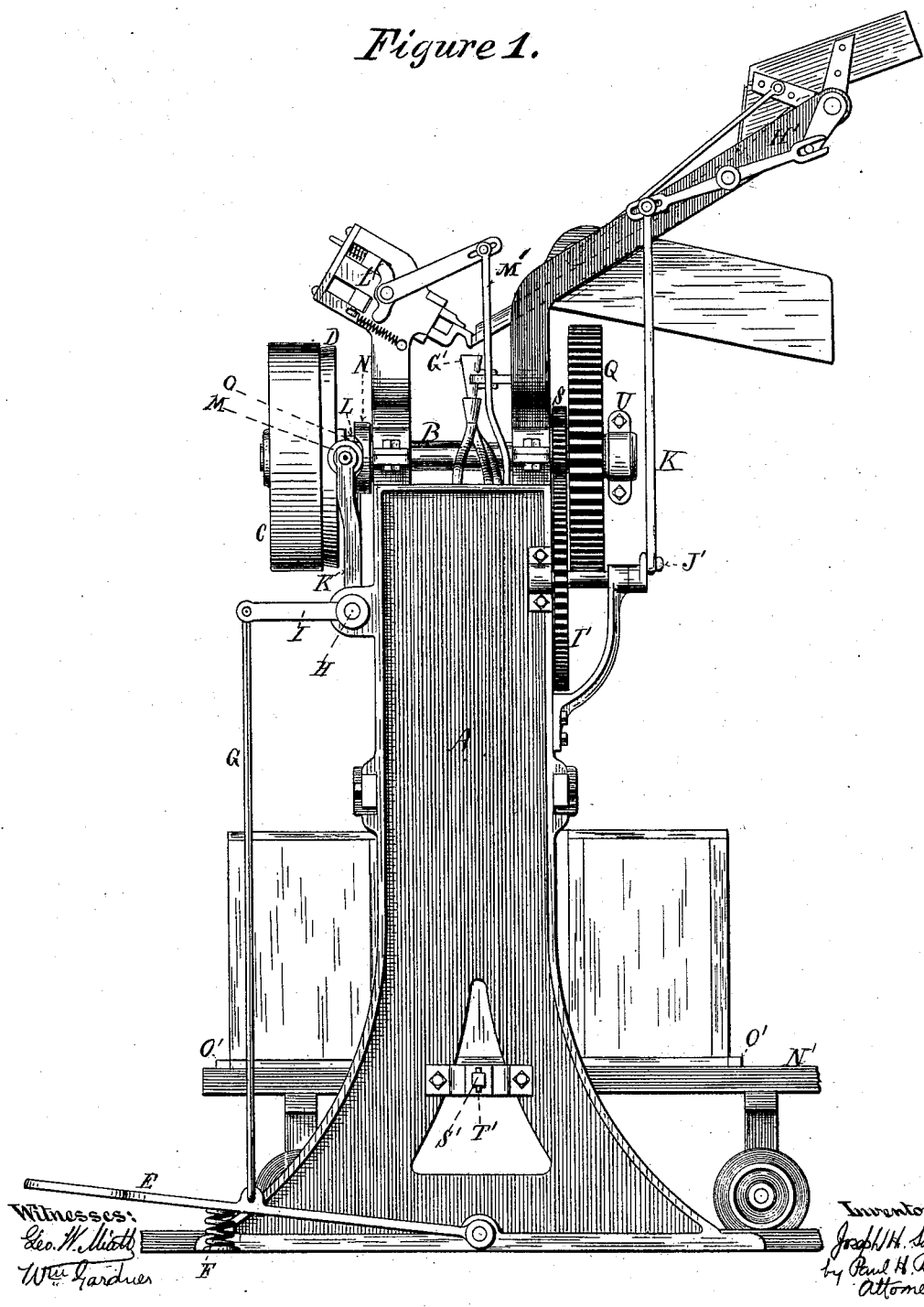
Figure 2:
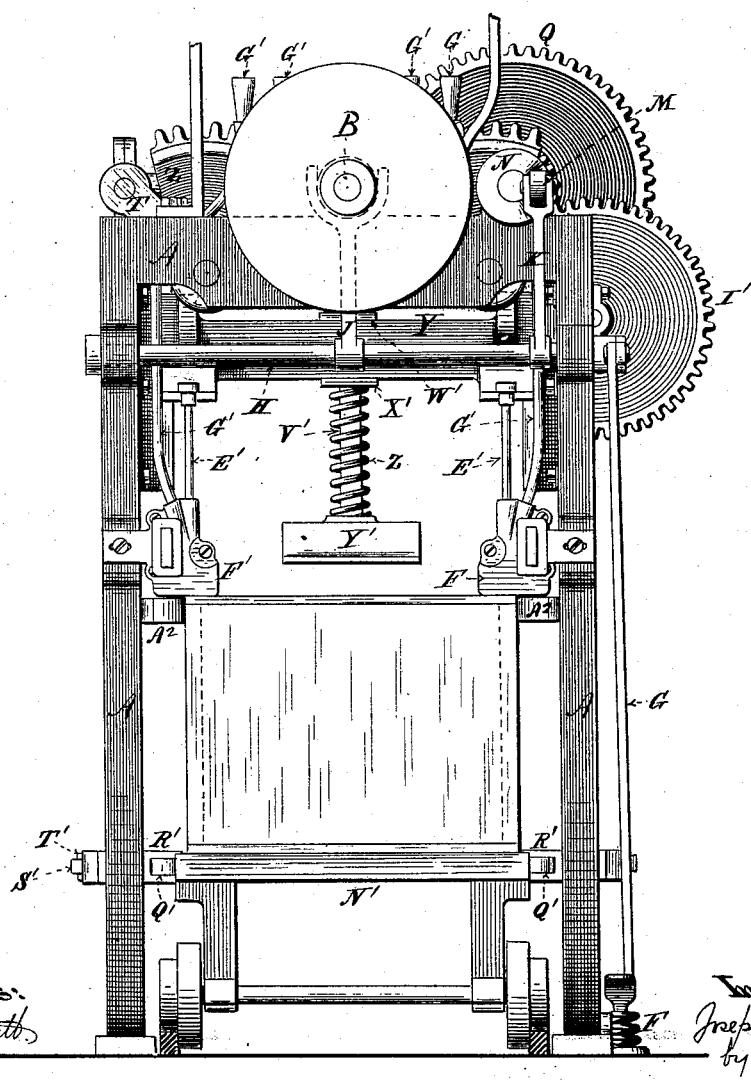
Figure 3:
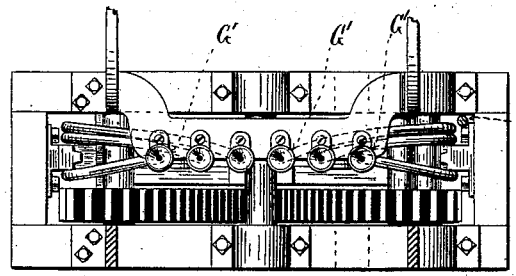
Figure 4:
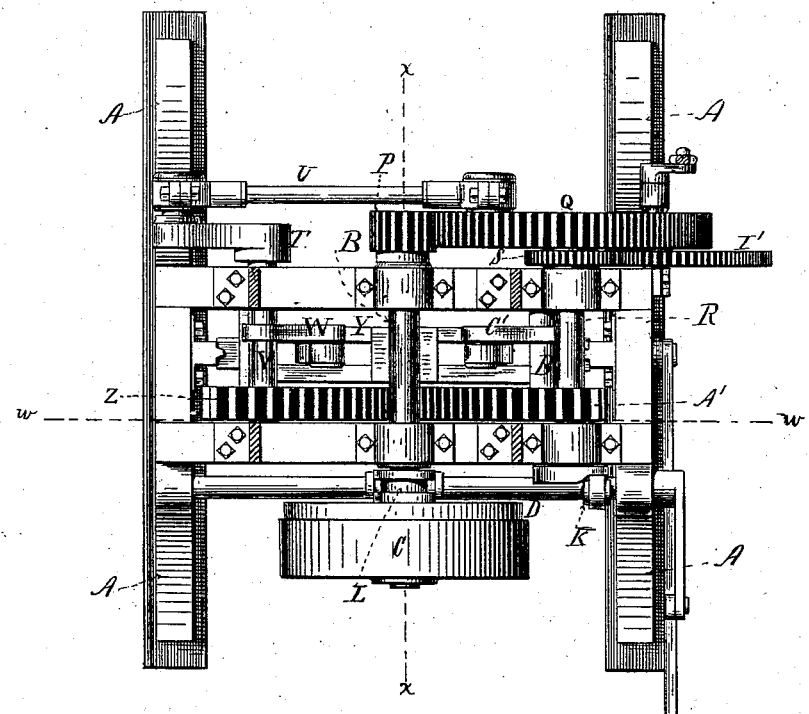
Figure 5:
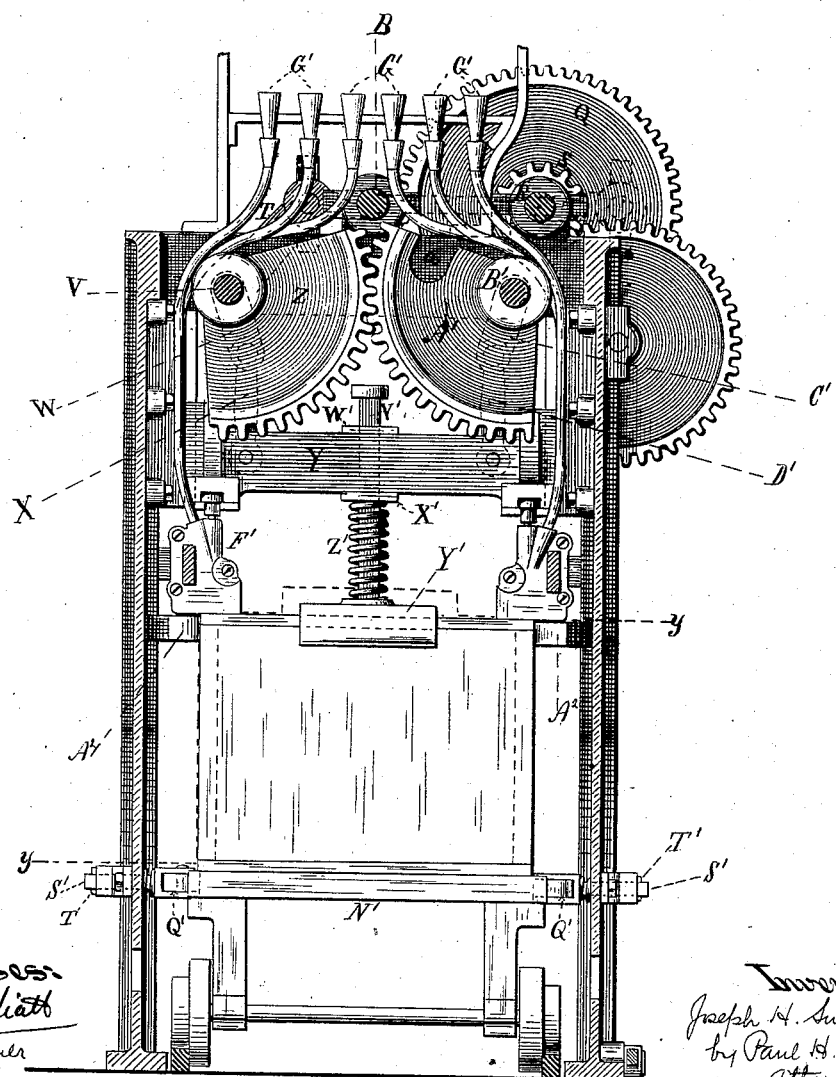
Figure 6:
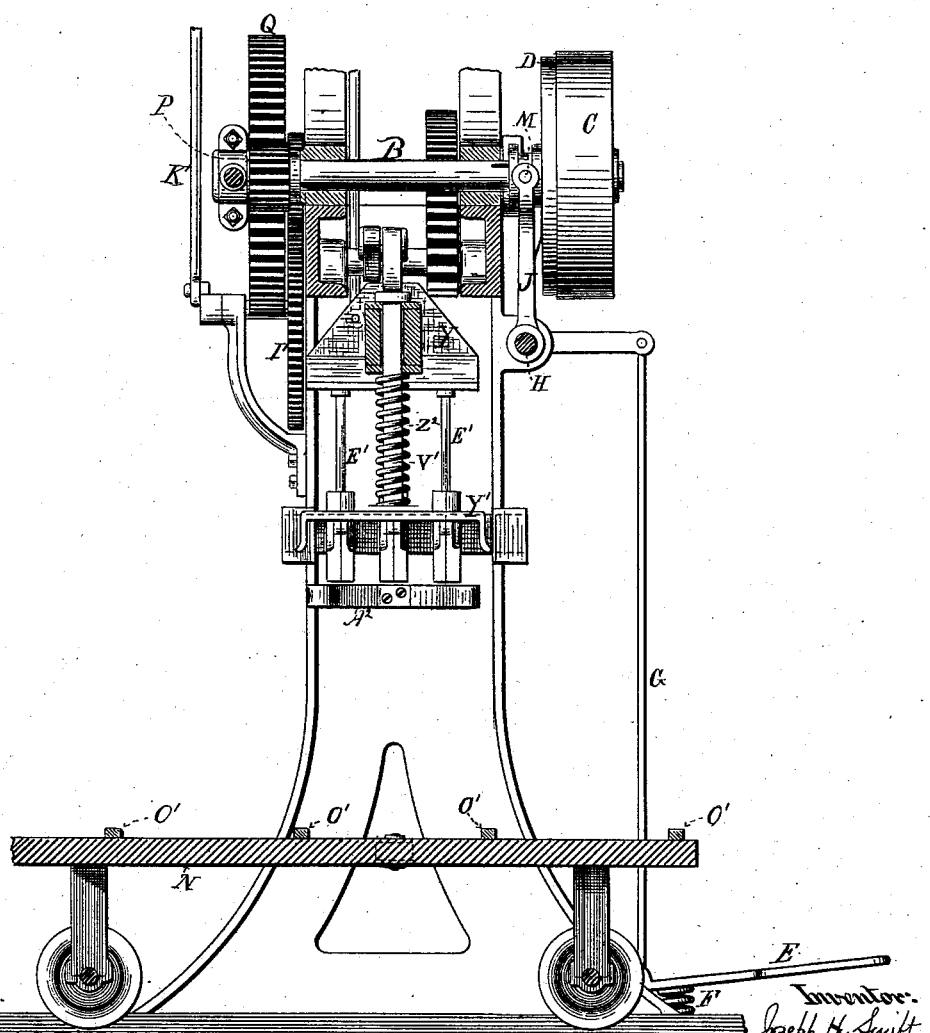

In the accompanying drawings, Figure 1 is intended to represent a side view of the machine and of the car and supported boxes; Fig. 2, a front view showing also the car and supported box; Fig. 3, a partial top view, including the tubes of the nail-feeder; Fig. 4, a top view, not including the tubes of the nail-feeder; Fig. 5, a vertical section on the plane of line $w\ w$ on Fig. 4, showing also the car and supported boxes; Fig. 6, a vertical section on the plane of line $x\ x$ on Fig. 4, showing also the car; Fig. 7, a horizontal section on the plane of line $y\ y$ on Fig. 5, showing also the car and supported boxes; Fig. 8, a central longitudinal section of a car, the shoulders or supports for holding the box or box-frame in proper position on the car-platform, together with a false box-bottom piece, also being shown; Fig. 9, a top view of the false box-bottom piece; Fig. 10, a sectional elevation of the lower part of the machine, showing, also in central longitudinal section, a car with an auxiliary platform, together with supported box-frames, and a false box-side piece with end shoulders or supports and braces; Fig. 11, a side view of a false box-side piece, showing the handle and end shoulders or supports, together with the braces; Fig. 12, a transverse section of the bed of the auxiliary platform, with shoulders or supports attached, and showing also the end pieces and one side piece of a box or box-frame, together with the false box-side piece, all in position for the nailing on of the first-named side piece; Fig. 13, a top view of three box-frames resting on the auxiliary platform of the car, the upper side piece being removed, in one instance, so as to expose to view the false box-side piece below.

In operating my invention, a frame, A, Fig. 2, of iron or other suitable material, is provided, and on the top of this frame is supported a shaft, B, Fig. 4, the journals of which shaft rest in suitable bearings, the said shaft having at one end a driving-pulley, C, which is driven by a belt from any suitable driving-power. The driving-pulley is loose on the shaft B, and has a conical recess in it, into which is fitted a conical friction-pulley, D. The friction-pulley is so secured to the shaft B that when forced into the said conical recess in the driving-pulley, and so made to revolve, the said shaft B is caused to revolve with it. The said friction-pulley is operated back and forth on the shaft B, being feathered thereon, into and out of the said conical recess in the driving-pulley, by means of a foot-piece, E, Fig. 1, retracting-spring F, connecting-rod G, and rock-shaft H, the said rock-shaft being supported in bearings on the frame A, and having a horizontal arm, I, secured to the connecting-rod G, and two vertical arms, J and K, Fig. 2, respectively. The hub of the friction-pulley has an annular groove, L, and the fork of the vertical arm J has at each of its upper ends a pin projecting inwardly, and intended to rest in the said groove. The vertical arm K of the said rock-shaft has in its upper ends a roller, M, which is intended to press or rest against the cam N, and to roll into the depression or recess O, Fig. 4, in said cam. The arm J may be adjusted by set-screws.

A pinion, P, Fig. 4, at the other end of the shaft B from the driving-pulley, drives the cog-wheel Q on the end of a shaft, R, and so gives motion thereto. On the shaft R is a pinion, S, and on the other end the cam N, before referred to. Motion is communicated from the cog-wheel Q to the rocker-arm T by means of the pitman U, which has two wrist-connections, respectively, one made with the said cog-wheel Q, near its rim, and the other with the said rocker-arm T. The rocker-arm T is secured to the rock-shaft V, which latter has another rocker-arm, W, Figs. 4 and 5, secured to it, and this latter rocker-arm W is connected by means of a wrist-connection with a link, X, the lower end of which link is pivoted on a bolt or pin between the two flanges of the cross-head Y, Fig. 5.

There is a segmental gear, Z, Fig. 5, on the shaft V, and from such segmental gear motion is communicated to another segmental gear, A', having a notch, a, so as to enable it to rock back and forth without coming into contact with the shaft R on a rock-shaft, B', which latter shaft, similar to the rock-shaft V, has secured to it a rocker-arm, C', Figs. 4 and 5, connected by means of a wrist-connection with a link, D', which link, like the link X, is pivoted to a bolt or pin between the two flanges of the cross-head, the intention being that the two segmental gears, together with the rocker-arms W and C' and links X and D', shall work in unison, intermittingly depressing and elevating the cross-head. The cross-head at each end moves up and down a suitable way.

Nail-punches E', three in number, for instance, Figs. 2 and 6, are properly suspended in and from the lower side, and on each end of the cross-head Y, and enter channels in the nail-boxes F', of which there are likewise three, the said nail-punches being reciprocated with the cross-head Y, but preferably not wholly withdrawn from said channels.

The nails are fed to the nail-boxes F' through the nail-tubes G', Figs. 2 and 3, the said nail-tubes being supplied with nails from the hopper H' of the nail-feeder, Fig. 1.

The pinion S, Figs. 1 and 2, communicates motion to the cog-wheel I', which latter revolves with its journal, the latter resting in suitable bearings. The journal of the cog-wheel I' has at its outside end a small crank, J', which operates the connecting-rod K', which in its turn operates the hopper of the nail-feeder, the check L' of the nail-feeder being operated by a rod, M', connecting with the cross-head, Fig. 1.

The construction and operation of the nail-feeder are fully shown and described in Letters Patent of the United States granted to John J. Sullivan on the 27th day of November, 1883, and numbered 289,360. Other forms of nail-feeders may, of course, be used with my box-nailing machine.

The construction and operation of the nail-boxes, nail-punches, nail-tubes, &c., are fully shown and described in Letters Patent of the United States granted to me on the 11th day of December, 1883, and numbered 289,941.

A car or its equivalent, N', Figs. 1, 2, and 10, to support the box or box-frame, and either the top, the bottom, or the side piece or pieces of the box, as the case may be, and to convey the same on a track or slide to a proper position, or to hold the same in a proper position with reference to the nailing mechanism in order that such top, bottom, or side piece or pieces of the box may be nailed to the box or box-frame, is also provided. This car may have on its platform shoulders or supports O', Figs. 6 and 8, so located and arranged on all four sides of the box, as to hold the box or box-frame steady and in proper position.

In order that it may be known when the car, together with the box or box-frame, and either the top, the bottom, or the side piece or pieces of the box supported on the same, are in proper position with reference to the nailing mechanism, recesses are made at proper intervals in the sides of the platform of the said car, as at P', Fig. 7, and into these recesses slips at the proper time a roller, Q', supported between the two ends of the fork R', at the inner end of a square metal rod or bar, S', running through and supported in a bearing, b, secured to the frame A, the outer end of the said rod or bar S' having a pin, T', in it, so that it cannot of itself slip through the frame A, and the inner end terminating in the fork R'. The said rod or bar S', just back of its forked end, has a spiral spring, U', placed around it, which acts between the fork R' and the inner side of the bearing b, so that the roller Q' shall press closely against the platform of the car N' and run into the recesses P' as they come opposite to it. The purpose of this device is to automatically check the car at the proper intervals—namely, whenever the box or box-frame and the top, bottom, or side piece or pieces of the box come into proper position for such top, bottom, or side piece or pieces to be nailed to the box or box-frame. A checking device of this kind may be on each side of the frame A, and car N'.

For the purpose of forcing and holding the top, bottom, or side piece or pieces of the box, as the case may be, in proper position with reference to the sides of the box or box-frame during the operation of nailing, a metal bar or rod, V', is passed through the space between the two flanges of the cross-head Y, having at its upper end and above the said cross-head, so as to prevent its falling through, a nut head or shoulder properly secured to it, the said bar or rod V' passing through two metal plates bolted to the two flanges of the said cross-head, one plate, W', being secured to the upper side of the said flanges and the other plate, X', to the under side of the same. To the lower end of the said bar or rod V' is secured a removable top or side holder, Y', a little longer than the top, bottom, or side piece or pieces of the box is wide, the longitudinal edges of the said holder projecting downward and curving slightly. A spiral spring, Z', is so placed around the said bar or rod V', between the holder Y' and the plate X', that the holder Y' will rest firmly upon the box or box-frame and top, bottom, or side piece or pieces, and yet not too rigidly. This holder Y' is intended to be intermittently moved down and up with the cross-head.

On each side of the inside of the frame A is secured a metal spring, A², having two curving arms, and secured at its center to the said frame A. The purpose of this latter spring is to push and hold in proper position the ends of the top, bottom, or side piece or pieces of the box with reference to the box-frame itself, and this desired result is brought about by so arranging the spring A² that its two arms on their face shall press tightly against the end of the top, bottom, or side piece or pieces, as well as against the upper edge of the end piece of the box or box-frame itself.

The false box-bottom piece shown in Fig. 9, and which is made of a piece of wood or other suitable material, B², of the same size and form as the top or bottom piece of the box, with a handle, C², secured to its central portion, is intended to be used before there has been either a top or a bottom piece nailed to the box, and the purpose of it is to raise the box-frame, with, say, its top piece resting upon it, sufficiently to bring such box-frame and top piece close enough to the nail-boxes, which have a fixed position to enable the nailing operation to be properly carried out. After such top piece has been nailed on, the false box-bottom piece may be removed, and the box-frame being turned over, the top piece will itself take the place of such false box-bottom piece during the operation of nailing on the bottom piece proper.

When the boxes are to be of the same height as width, the side piece or pieces of the box-frame may be nailed to the end pieces of the box-frame by the same means and in the same way as the top and bottom pieces, excepting that the false box-bottom piece should have end shoulders or supports and braces, as in the case of the false box-side piece, Fig. 11, in order that the end pieces of the box-frame may be held upright and in position.

When the boxes are to be made of a less width than height, an auxiliary platform, D², Fig. 10, is provided for the car, on which the parts of the box-frame are to be supported for the purpose of raising up the parts of the box-frame sufficiently with reference to the nail-boxes, &c. This auxiliary platform is made of the same size and form as the platform proper of the car, and is sustained on the same by means of supports E², Fig. 10, which are held in position by the shoulders or supports O' on the platform proper. This auxiliary platform likewise has shoulders or supports F², Figs. 10 and 12, secured to it, which are intended to hold the parts of the box-frame in proper position.

A false box-side piece, Fig. 11, is also provided, which is composed of a piece of wood or other suitable material, G², of the same size and form as the side piece or pieces proper of end supports or shoulders, H²; braces I², and handle J², secured to its central portion, and which is intended to be used in the same way as the false box-bottom piece.

The operation of my box-nailing machine is as follows: Three box-frames, for instance, with their bottom pieces and with the false box-bottom pieces, are placed on the platform of the car in proper position, being held steady thereon by the shoulders or supports O'. The car is then run or pushed along the track or slide until the first box is in proper position with reference to the nailing mechanism, that position being indicated by the checking of the car by means of the automatic checking device, consisting of the roller Q' and its connecting parts and the recess P' in the platform of the car, the roller Q' slipping into the said recess, and so, to a greater or less extent, checking and holding the car. The springs A² have meanwhile forced the ends of the bottom piece in proper position with reference to the ends of the box-frame. The operator of the machine then quickly and strongly presses his foot for an instant on the end of the foot-piece E, thus depressing it, and by means of the connecting-rod G and the rock-shaft H, with its arms, causing the friction-pulley to push or press into the conical recess in the driving-pulley, and the roller M in the arm K of the rock-shaft H to be thrown out of the depression or recess O in the cam N. The friction-pulley, bound by friction to the driving-pulley, which has meanwhile been set in motion by the driving power, is caused to revolve, and, revolving, turns with it the shaft B, which in its turn revolves the pinion P, which latter causes the cog-wheel Q to revolve. The motion of the said cog-wheel Q causes the pitman U to have a reciprocating motion, which latter motion is communicated to the rocker-arm T, the rock-shaft V, the rocker-arm W, and the segmental gear Z. The motion of the rocker-arm W causes the link X, together with the link D', to which similar motion is meanwhile communicated by means of the other segmental gear, A', operating in unison with the segmental gear Z and by means of the rock-shaft B' and rocker-arm C' to intermittently depress and elevate the cross-head Y. The cross-head being depressed, the nail-punches E', suspended from it, are forced down through the channels in the nail-boxes F' and drive the nails, which are supplied through the nail-tubes G', into the bottom piece and the ends of the box-frame. The rod or bar with the holder attached to its lower end, being at the same time depressed, forces and holds the bottom piece of the box in proper position with reference to the sides of the box-frame. In the meantime the pinion S has caused the cog-wheel I' to revolve, and likewise the journal of such cog-wheel, to the end of which journal is secured the crank J', and this crank, in conjunction with the connecting-rod M', operates the nail-feeder. The bottom piece having been nailed to the box-frame, the depression or recess in the face of the cam N has come opposite to the roller M in the arm K, which roller has before been pressing closely, but not too tightly, against the surface of the cam, and the said roller is immediately forced into the said recess or depression, and the friction-pulley forced out of the driving-pulley because of the force of the retracting-spring F acting through the intermediate parts, which spring is released or allowed play by reason of the reception by the recess O in the cam N of the roller M, and the machine then stops. After the machine has stopped, the car may then be withdrawn from the nailing mechanism or drawn or pushed to the other side of the same, as desired. The same operation is then repeated as many times as there may be bottom pieces to be nailed to box-frames.

In nailing the top pieces to the box-frames, the false box-bottom piece is taken out, the bottom piece proper serving the same purpose. The operation is otherwise the same as in the case of nailing on the bottom pieces.

In nailing the first side piece to the ends of the box or box-frame, the false box-side piece is placed in position on the auxiliary platform, the end pieces placed between the shoulders or supports, and the side piece to be nailed on then laid on the top of such end pieces. The car is then pushed or drawn into proper position with reference to the nailing mechanism, and the side piece held in position by the springs A² and a holder, which is intended to be removable, like the holder Y', and to be of the proper size and form. After one side piece has been nailed on, the box-frame may be turned over, the false box-side piece being also removed, and the other side piece then nailed on, the same course being followed as in the case of nailing on the top piece of the box.

In nailing together the different parts or pieces of the box-frame, the number of nail-boxes, nail-punches, nail-tubes, &c., or the numbers of such used may be varied, as well as in nailing together the parts of boxes of different forms or sizes.

In the practice of my invention I do not limit myself to the exact construction of box-nailing machines herein described and shown, nor to the exact form of the special devices herein shown and described, and for which I am desirous of securing Letters Patent.

What I claim as my invention, and desire to secure by Letters Patent, is—

1. The combination, with a box-nailing machine, of the car for supporting the box or box-frame or the different parts or pieces thereof, and for conveying the same to the proper position with reference to the nailing mechanism in order that the different parts or pieces of the box or box-frame may be nailed together.

2. The combination, with the car to be used in connection with a box-nailing machine, of shoulders to hold in proper position with reference to the nailing mechanism on such car the part or parts of the box or box-frame intended to be supported thereby.

3. The combination, with a box-nailing machine and the car to be used in connection therewith, of a check for automatically checking and holding the car in the proper position at the proper interval or intervals with reference to the nailing mechanism of such box-nailing machine, substantially as described.

4. In a box-nailing machine, a vertically-reciprocating cross-head provided at each end with a set or series of nail-punches, substantially as described, in combination with nail-boxes secured to stationary parts of the machine, and to co-operate with such nail-punches, substantially as set forth, for nailing both ends of the box or box-frame at the same instant and by one operation.

5. The combination, with a box-nailing machine and a bed to support the box or box-frame or the different parts or pieces thereof in proper position with reference to the nailing mechanism, of springs, substantially as described, to force and hold both ends of the top, the bottom, or the side piece or pieces of the box or box-frame in proper position with reference to the other parts or pieces of the box or box-frame during the operation of nailing.

6. The combination, with a box-nailing machine and the car to be used in connection therewith, of springs, substantially as described, to force and hold both ends of the top, the bottom, or the side piece or pieces of the box or box-frame in proper position with reference to the other parts or pieces of the box or box-frame during the operation of nailing the same.

7. The combination, with a box-nailing machine for nailing both ends of the box or box-frame at the same instant and by one operation, and a bed to hold such box or box-frame or the different parts or pieces thereof in proper position with reference to the nailing mechanism, of the holder, constructed substantially as described, and operated by, but not forming part of, the cross-head to force and hold the sides of the top, the bottom, or the side piece or pieces of the box or box-frame in proper position with reference to the other parts or pieces of the box or box-frame during the operation of nailing.

8. The combination, with a box-nailing machine and the car to be used in connection therewith, of the holder, constructed substantially as described, and operated by, but not forming part of, the cross-head to force and hold the sides of the top, the bottom, or the side piece or pieces of the box or box-frame in proper position with reference to the other parts or pieces of the box or box-frame during the operation of nailing.

9. The combination, with the car to be used in connection with a box-nailing machine, of the auxiliary platform, constructed substantially as described, and to be used for the purposes specified.

10. The combination, with a box-nailing machine and a support or rest to hold the box or box-frame or the different parts or pieces thereof in proper position with reference to the nailing mechanism, of the removable false box-bottom piece, substantially as described, and for the purposes set forth.

11. The combination, with a box-nailing machine and a support or rest to hold the box or box-frame or the different parts or pieces thereof in proper position with reference to the nailing mechanism, of removable false box-side piece, substantially as described, and for the purposes set forth.

JOSEPH H. SWIFT.

Witnesses:
GEO. H. EVANS,
GEO. W. MIATT.